April 26, 1932. J. S. STULL 1,855,874
APPARATUS FOR FORMING ARTICLES
Filed Aug. 23, 1929 2 Sheets-Sheet 1

Inventor
John S. Stull
By H. A. Pattison Atty.

April 26, 1932. J. S. STULL 1,855,874
APPARATUS FOR FORMING ARTICLES
Filed Aug. 23, 1929 2 Sheets-Sheet 2

Inventor
John S. Stull
By H.A.Pattison Atty.

Patented Apr. 26, 1932

1,855,874

UNITED STATES PATENT OFFICE

JOHN S. STULL, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR FORMING ARTICLES

Application filed August 23, 1929. Serial No. 387,909.

This invention relates to an apparatus for forming articles, and more particularly to fixtures for automatic machines designed to produce articles.

The invention is particularly applicable to the manufacture of piece parts on automatic screw machines wherein successive forming operations are performed on blank or bars of stock to produce piece parts of predetermined accurate shape and dimensions.

An object of the invention is to provide an apparatus for forming articles rapidly and accurately and requiring a minimum of attention on the part of the operator.

In one embodiment of the invention, a bar of stock is mounted in a spindle which is constantly rotated about its longitudinal axis. A fixture is mounted adjacent one end of the bar of stock and carries a slide which is movable transversely of the axis of rotation of the bar. The slide carries a tool having a plurality of spaced cutting edges adapted to form a plurality of surfaces of revolution on the end of the bar. By suitably synchronized yielding actuating means, the slide is moved toward the bar until the forming tool has formed the surfaces to their final dimensions, a member being provided on the slide to engage the outer surface of the spindle and limit the movement of the slide in accordance with the position of the spindle. The dimensions of the finished surfaces are thereby made independent of the possibly varying positions of the spindle in successive operations, which makes possible more uniform and accurate finishing of the parts. The spindle and bar of stock are then indexed into operative position with respect to a second fixture, the operation of which is controlled in a manner similar to that above described, and a further operation is performed on the bar.

The invention will be more fully understood from the following description, taken in connection with the appended drawings, in which.

Figure 1:
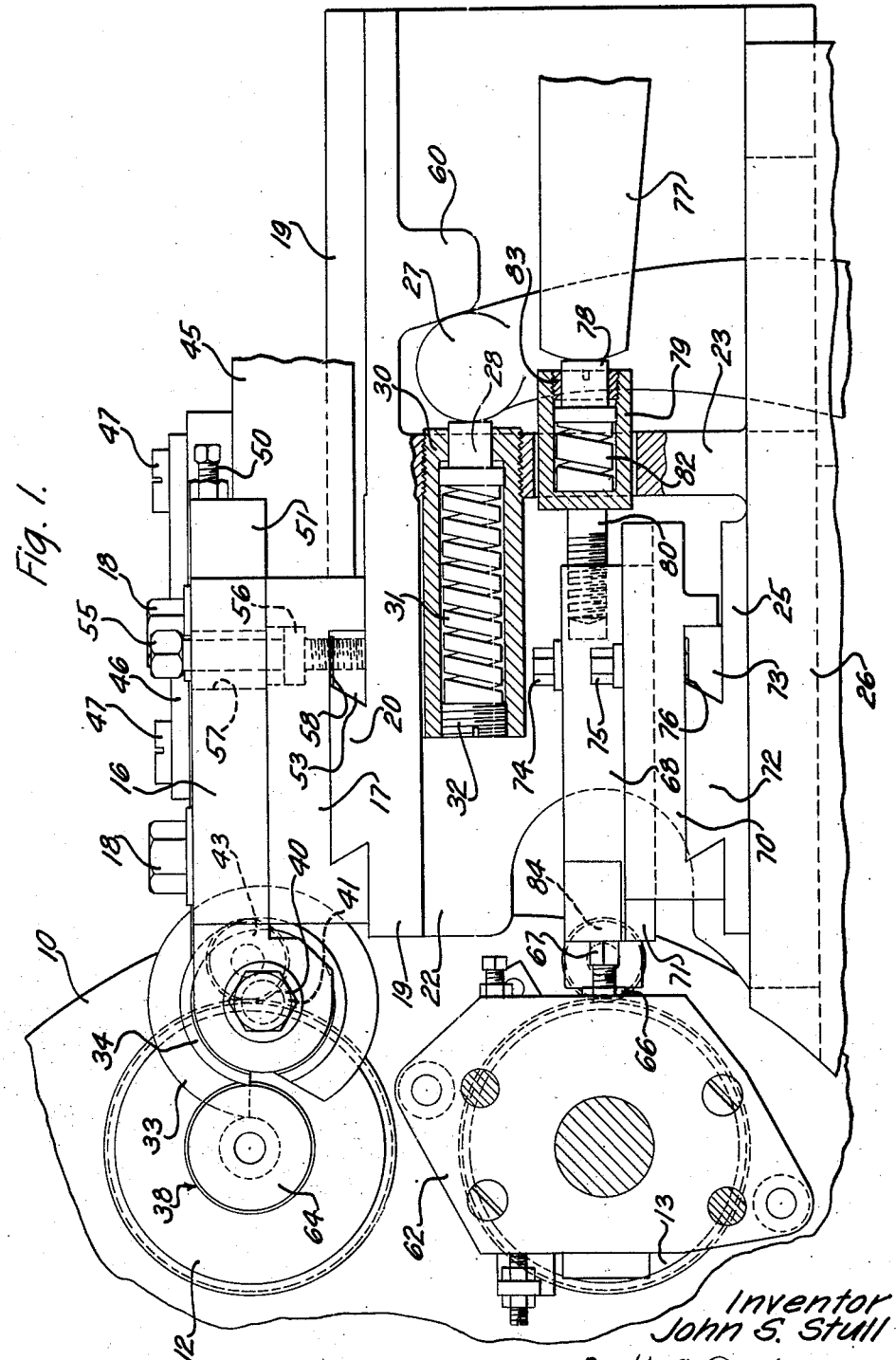
Fig. 1 is a fragmentary elevation of a machine embodying the invention.

Referring more particularly to the drawings, the fixture illustrated therein is designed to be applied to an automatic screw machine of the type wherein a plurality of tools are positioned at spaced stations, and a plurality of bars of stock material are held in spindles which are rotatably mounted in a spindle head, the spindle head being intermittently rotated to index the bars successively into juxtaposition with each of the stations. The tools are periodically advanced into operative positions relative to the bars of stock, and the bars are constantly rotated about their respective axes by the spindles to cause the various tools to perform work on the ends of the bars. Suitable actuating means of known construction are mounted adjacent the spindle head and are moved transversely in timed relation to advance tool-carrying members into operative relation to the work.

As will be seen in the drawings, the automatic machine comprises a rotatable spindle head 10 which carries a plurality of spindles 11 which terminate in chucks 12—13, of which but two are shown in the drawings, since all are identical in construction. The spindles are positioned at spaced points around the periphery of the spindle head 10 and are designed to receive the several bars of stock 15. The spindles are rotated about their respective axes by suitable known driving means, the bars being periodically advanced longitudinally of the spindles by suitable advancing means which form a part of the known automatic machines and are not shown in the drawings.

Disposed laterally with respect to the chuck 12 is a transversely movable tool-holding member 16 which is adjustably mounted on a supporting member 17 by means of bolts 18. The member 17 is slidably mounted on a member 19 by means of a dovetail flange 20 which slides in a correspondingly shaped groove in member 17. This construction permits the member 16 to be adjusted longitudinally of the machine. Member 19 has a lower portion 22 which is provided with a vertical extension 23. The extension 23 connects with a base portion 25 which is slidably mounted for movement toward and away from the work in a base member 26 secured to the frame of the machine.

The tool holding member 16 is periodically moved toward the work by an actuating lever 27 which contacts with a stud 28 seated in a sleeve 30 fixed to the vertical extension 23. The stud 28 is yieldingly held in its normal position by a strong coiled spring 31, which may be adjusted by turning an adjusting screw 32 threaded in the inner end of sleeve 30.

Figure 2:
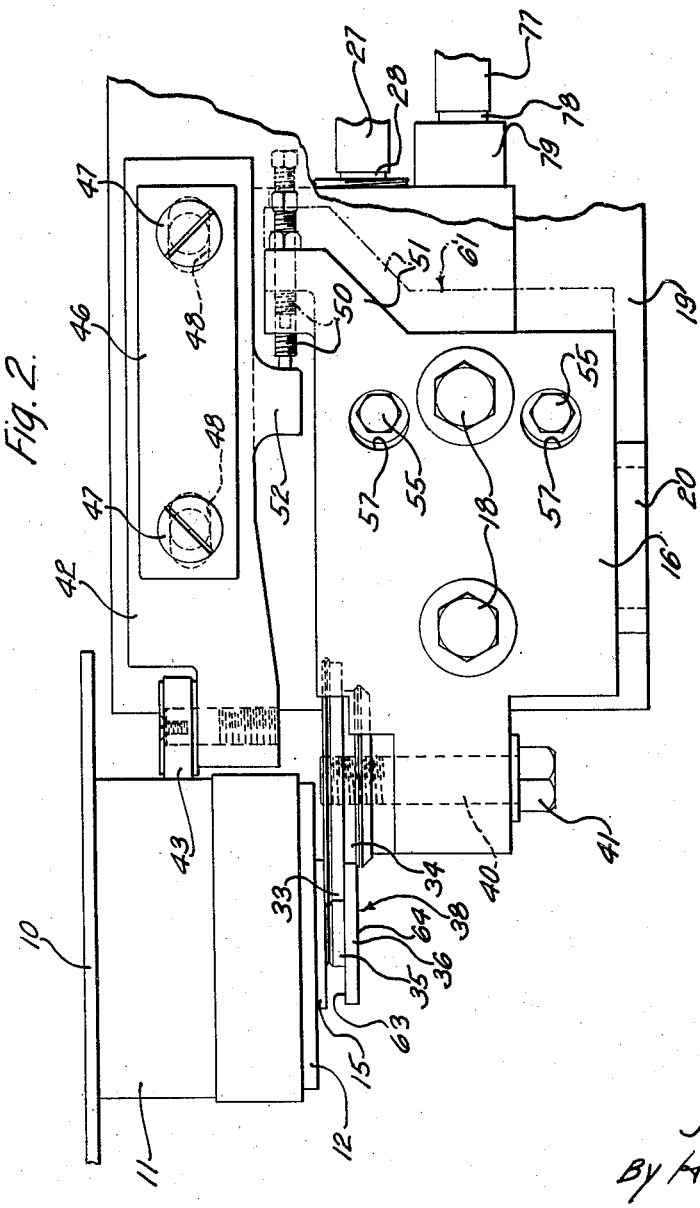
Fig. 2 is a fragmentary plan view of the same.

At the left side of the member 16 as viewed in Figs. 1 and 2 is mounted a forming tool having cutting members 33, 34, designed to form the two surfaces of revolution forming the hub 35 and the flange 36 of a telephone transmitter electrode 38. The tool is held fixedly with relation to the tool holder 16 by a bolt 40, which may be loosened by means of a head 41 to permit angular adjustment of the tool.

At the rear of the tool holder 16 is mounted a stop member 42 (Fig. 2) which carries a stop roller 43 adapted to engage the cylindrical surface of the rotating spindle 11 and be rotated thereby. In order to render the apparatus sufficiently accurate for precise work, the portions of the outer surfaces of the spindles 11 which contact with roller 43 should be ground to a truly cylindrical shape. The stop member 42 slides upon a member 45 which is formed integral with the base member 26. The stop member 42 is held in position by a plate 46 which is secured in position by screws 47 passing through the plate and through slots 48 formed in the stop member 42. The member 42 is moved toward the spindle 11 by means of an adjustable driving screw 50 threaded in an arm 51 formed on the member 16 and having its forward end abutting against a boss 52 formed on the stop member 42.

The supporting member 17 has a clamping wedge 53 shaped to engage one of the undercut surfaces of flange 20 to prevent relative movement between members 17 and 19 when the parts are in their adjusted position. A pair of bolts 55 having flanges 56 are seated in recesses in the member 17 and their heads project upwardly through cylindrical bores 57 formed in the member 19 to a point where they are accessible for turning by means of a wrench. The upper surface of clamping wedge 53 is cut away as indicated at 58 (Fig. 1) to allow the wedge to bear against flange 20 with sufficient pressure to prevent relative movement between the members 17 and 19 when the bolts 55 are tightened.

In the operation of the apparatus thus far described, a plurality of bars 15 are inserted in the work holding spindles 11 of the spindle head 10. The bars are then indexed with respect to an equal number of stations, where a plurality of operations are performed on them. When one of the bars 15 is indexed into juxtaposition with the tool holder 16, the actuating lever 27 is moved to the left through a predetermined distance by cam mechanism not shown but forming a part of the known automatic machines, thus moving the tool holder 16 and the forming tool carried thereby in the same direction. When the forming tool has been moved through its operating stroke with respect to the electrode 38, the roller 43 contacts with the accurately machined surface of the spindle 11, thus preventing further movement of the tool, whereupon spring 31 is progressively compressed and stud 28 slides within the sleeve 30 until the actuating lever 27 has reached the limit of its operating stroke.

The forming tool is thus accurately positioned with respect to the spindle 11 and bar 15 regardless of any variation in the distance between the axis of spindle 11 and the axis of spindle head 10. Thus, if the axis of a given spindle is displaced abnormally outwardly from the axis of the spindle head by a given amount, the stop roller 43 will arrest the movement of the forming tool at a point which is displaced outwardly from the axis of the spindle head by a corresponding amount. Likewise, if the axis of the spindle is displaced inwardly from its normal position relative to the axis of the spindle head, the stop roller will not arrest the movement of the forming tool until it has moved inwardly a sufficient distance to compensate for the displacement of the spindle.

When the tool has completed its operating stroke, the actuating lever 27 is retracted by means not shown, and in its outward movement abuts against a boss 60 formed on the member 19 to move the forming tool to inoperative position, the arm 51 being moved to the position indicated in dot and dash lines at 61 in Fig. 2. The roller 43 is then free to move clear of the spindle 11, and spindle head 10 is thereupon indexed to bring the bar 15 into registry with the next operating station, the mechanism of which will now be described.

Positioned below tool holder 16 and in operative relation to the chuck 13 of the next operating station is a fixture 62 which is designed to perform another operation on the bar 15. Such fixture may be of the construction illustrated and described in my copending application, Serial No. 383,384, filed August 3, 1929, and designed to face or finish the surfaces 63 and 64 of the electrode 38, which surfaces extend generally perpendicularly to the axis of spindle 11. As described in the copending application above referred to, the surfaces 63 and 64 may be finished by the operation of a pair of spaced tools which are simultaneously moved through a predetermined distance to finish the surfaces to the desired dimensions. The tools are mounted on a common slide 66 (Fig. 2) which has fixed thereto a driving screw 67 designed to contact with an actuating slide 68, the general construction of which is similar to that of stop member 42 above described.

Slide 68 is slidably mounted on a supporting member 70 by means of a dovetail flange 71 which engages in a correspondingly shaped groove in member 70. The member 70 is in turn slidably mounted on the base portion 25 by means of a dovetail flange 72 which engages a correspondingly shaped groove in member 70 to permit the slide 68 to be adjusted longitudinally of the machine. The supporting member 70 has a clamping wedge 73 shaped to engage one of the undercut surfaces of the flange 72 to prevent relative movement between the members 70 and 25 when the parts are in their adjusted position. Bolts 74 and 75, similar to bolts 55 above described, are seated in recesses in member 70, the bolt 74 being elongated for greater accessibility. The upper surface of the wedge 73 is cut away as indicated at 76 to allow the wedge to bear against the flange 72 with sufficient pressure to prevent relative movement between the members 70 and 25 when the bolts 74 and 75 are tightened.

Slide 68 is periodically moved toward the work by means of an actuating lever 77 which contacts with a pin 78 seated in a sleeve 79 which is secured by means of a threaded stud 80 to slide 68 and is freely slidable in an aperture formed in the vertical extension 23. The pin 78 is yieldingly held in its normal position by a stiff coiled spring 82, and is held within the sleeve 79 by a bushing 83 threaded in the outer end of sleeve 79 and surrounding the pin 78.

At the rear of slide 68 is mounted a stop roller 84, similar to stop roller 43, above described, and adapted to engage the cylindrical surface of rotating spindle 11 and to be rotated thereby.

In the operation of the apparatus just described, a bar 15, having been operated upon by the cutting members 33 and 34, is indexed into operative relation with the fixture 62. The actuating lever 77 is then moved to the left through a predetermined distance by cam mechanism not shown but forming a part of the known automatic machines, thus moving slide 68, slide 66, and the tools carried thereby, in the same direction. When the tools have been moved through a predetermined distance constituting their operating stroke, the roller 84 contacts with the surface of spindle 11, thus preventing further movement of the tools, whereupon spring 82 is progressively compressed and pin 78 slides within sleeve 79 until the lever 77 has reached the limit of its forward movement. The operating stroke of the tools carried by slide 66 with respect to the bar 15 is thus accurately defined regardless of any variation in the distance between the axis of spindle 11 and the axis of spindle head 10.

When the tools carried by slide 66 have completed their operation, the lever 77 is retracted. The spindle head 10 is thereupon indexed to bring the bar 15 into registry with the next operating station (not shown) where a further operation is performed upon the electrode.

It will be understood that the embodiment herein described is merely illustrative of the invention, which is limited only by the terms of the appended claims.

What is claimed is:

1. In a multiple spindle screw machine wherein the spindles are rotated about a common central axis, a tool holder associated with the spindles, means for moving the tool holder into operative relation to one of the spindles, and means carried by said tool holder and arranged to engage the spindles while associated therewith for limiting the movement of the tool holder to compensate for lateral displacement of the spindle relative to said axis.

2. In a multiple spindle screw machine wherein the spindles are rotated about a common central axis to index them successively with respect to a fixed station, a tool holder positioned at the station, means for moving the tool holder into operative relation to a spindle positioned at the station, and means arranged to cooperate with the spindle at the station for limiting the movement of the tool holder in accordance with the distance between said spindle and the central axis.

3. In a multiple spindle screw machine wherein the spindles are rotated about a common central axis to index them successively with respect to a fixed station, a tool holder positioned at the station, a rotatable member carried by said tool holder, and means for moving the tool holder into operative relation with a spindle positioned at the station whereby the rotatable member may engage with the periphery of the spindle positioned at the station for limiting the movement of the tool holder in accordance with the distance between said spindle and the central axis.

4. In a multiple spindle screw machine wherein the spindles are rotated about a common central axis to index them successively with respect to a fixed station, a tool holder positioned at the station, a tool carried by said tool holder, resilient means for moving the tool holder and tool into operative relation with the spindle positioned at the station, and a rotating member carried by said tool holder and adapted to engage the periphery of the spindle positioned at the station for limiting the movement of the tool and tool holder in accordance with the distance between said spindle and the central axis.

5. In a multiple spindle screw machine wherein the spindles are rotated about a common spindle axis to index them successively with respect to fixed stations, a plurality of tool holders positioned at the stations, means for advancing the tool holders simultaneously into operative relation to the spindles positioned at the stations, and means associated with the spindles at the stations for limiting the movement of the tool holders in accordance with the distance between the spindles at the stations and the central axis.

6. In a multiple spindle screw machine wherein the spindles are rotated about a common central axis to index them successively with respect to a fixed station, a tool holder positioned at the station, a member carried by said tool holder, and means for moving the tool holder into operative relation with a spindle positioned at the station, whereby the member may engage the periphery of the spindle positioned at the station for limiting the movement of the tool holder.

7. In a movable spindle screw machine wherein the spindles for holding the work are rotated about a common central axis to index them successively with respect to a plurality of stations, a plurality of tool holders positioned at the stations for supporting tools movable into engagement with the work at the stations, means whereby said tool holders may be moved simultaneously for moving the tools carried thereby into engagement with the work, and means carried by the tool holders and arranged to engage their associated spindles for limiting the movement of said tools in accordance with the distance between the spindles themselves and between the spindles and the central axis.

8. In a movable spindle screw machine wherein the spindles for holding the work are rotated about a common central axis to index them successively with respect to a plurality of stations, a plurality of tool holders positioned at the stations for supporting tools movable into engagement with the work at the stations, means whereby said tool holders may be moved simultaneously for moving the tools carried thereby into engagement with the work, and means for limiting the movement of said tools in accordance with the positions of said spindles relative to each other or to said central axis, said means comprising rotatable members carried by said tool holders and arranged to engage the peripheries of said spindles during the movement of said tools relative to the work.

In witness whereof, I hereunto subscribe my name this 17th day of August, A. D. 1929.

JOHN S. STULL.